(12) United States Patent
Lubben

(10) Patent No.: US 11,698,122 B2
(45) Date of Patent: Jul. 11, 2023

(54) VARIABLE SPEED AND REVERSIBLE DUAL PATH FAN DRIVE SYSTEM

(71) Applicant: Deere & Company, Moline, IL (US)

(72) Inventor: Jeffrey L. Lubben, Hudson, IA (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 17/077,454

(22) Filed: Oct. 22, 2020

(65) Prior Publication Data

US 2022/0128128 A1 Apr. 28, 2022

(51) Int. Cl.
*F16H 3/54* (2006.01)
*F16H 57/029* (2012.01)
*F16H 57/04* (2010.01)
*F04D 25/08* (2006.01)

(52) U.S. Cl.
CPC ............. *F16H 3/54* (2013.01); *F16H 57/029* (2013.01); *F16H 57/0471* (2013.01); *F16H 57/0484* (2013.01); *F04D 25/08* (2013.01); *F16H 2200/2005* (2013.01)

(58) Field of Classification Search
CPC ...... F16H 3/54; F16H 57/029; F16H 57/0471; F16H 57/0484; F16H 2200/2005; F04D 25/08

See application file for complete search history.

(56) References Cited

U.S. PATENT DOCUMENTS

| | | |
|---|---|---|
| 3,853,098 A | 12/1974 | Ishikawa et al. |
| 3,894,521 A | 7/1975 | Sakasegawa et al. |
| 4,223,646 A | 9/1980 | Kinder |
| 4,239,977 A * | 12/1980 | Strutman ................ F03D 7/028 416/41 |
| 4,461,246 A | 7/1984 | Clement |
| 4,648,040 A | 3/1987 | Cornell et al. |
| 4,709,666 A | 12/1987 | Merz |

(Continued)

FOREIGN PATENT DOCUMENTS

| | | |
|---|---|---|
| DE | 19749074 A1 | 5/1999 |
| DE | 112014004524 B4 | 6/2021 |
| JP | 2010 280 324 A | 12/2010 |

OTHER PUBLICATIONS

German Search Report issued in application No. DE102021209917.3, dated May 6, 2022, 10 pages.

*Primary Examiner* — Colby M Hansen
(74) *Attorney, Agent, or Firm* — Tucker Ellis LLP

(57) ABSTRACT

A drive system includes a planetary gear set having first and second rotatable input members connected in driven relation with respective first and second power sources, and a rotatable output member connected in driving relation with a working piece, the first and second rotatable input members being connected in differentially rotatable communication with the output member. The input members are operable to vary the rotation and direction of the output member and the connected working piece. In an aspect, the output member is rotatable about an axis for driving the working piece, and the first and second input members are also rotatable about the axis. In a further aspect, the first and second input members include coupling regions for coupling the first and second power sources on-axis with the drive system. In a further aspect, the second power source is a hydraulic input motor concentric with the first input member.

20 Claims, 7 Drawing Sheets

(56) References Cited

U.S. PATENT DOCUMENTS

| | | | |
|---|---|---|---|
| 4,941,437 A | 7/1990 | Suzuki et al. | |
| 5,224,446 A | 7/1993 | Okita et al. | |
| 6,050,228 A * | 4/2000 | Garnett | F01P 7/044 |
| | | | 123/41.12 |
| 7,914,411 B2 * | 3/2011 | Basteck | F16H 47/085 |
| | | | 475/35 |
| 8,668,610 B1 * | 3/2014 | Zhou | F03D 15/10 |
| | | | 475/72 |
| 9,402,344 B1 | 8/2016 | Wenzel et al. | |
| 9,581,140 B2 * | 2/2017 | Crane | F03D 15/00 |
| 9,835,140 B2 * | 12/2017 | Henderson | F03D 7/0276 |
| 2010/0285913 A1 * | 11/2010 | Burjes | F16H 47/04 |
| | | | 475/72 |
| 2011/0009225 A1 | 1/2011 | Husson | |
| 2011/0229324 A1 * | 9/2011 | Hehenberger | F03D 15/00 |
| | | | 416/170 R |
| 2012/0328454 A1 * | 12/2012 | Roby | F01P 7/046 |
| | | | 474/8 |
| 2014/0221146 A1 * | 8/2014 | Krittian | F16H 47/04 |
| | | | 475/218 |
| 2015/0219077 A1 * | 8/2015 | Henderson | F16H 47/04 |
| | | | 60/459 |
| 2016/0032817 A1 | 2/2016 | Buschur | |

\* cited by examiner

VARIABLE SPEED AND REVERSIBLE DUAL PATH FAN DRIVE SYSTEM

FIELD OF THE DISCLOSURE

The disclosures herein relate to drive systems and, in particular, to variable speed and reversible on-axis dual path drive systems for rotating associated equipment pieces. Although the example embodiments will be described with reference to such systems rotating a fan to move air through a radiator of a work vehicle such as an agricultural or construction vehicle, it is to be appreciated that the descriptions herein are not so limited and have broader application including for example in stationary or portable power equipment and anywhere driving associated workpiece at variable speeds and in reverse would be beneficial.

BACKGROUND

There are currently a wide range of fan drive mechanisms available for powering fans to generate an airflow used for cooling radiators and the like in industrial, commercial, agricultural, construction and other applications. As an example, direct drive and various pulley and belt systems have been used to couple the crankshaft of an internal combustion motor of a power unit with a fan for generating an airflow through the radiator of the power unit. Power units with drive systems of this type may be used in trucks, tractors, and other mobile vehicles as well as stationary equipment.

Systems such as described above are adequate in many applications but have been found to be inefficient primarily because of the direct relationship between the engine speed and the resultant fan speed. A high engine speed in these systems induces in a high fan speed regardless of whether the system cooled by the fan needs the large airflow produced by the high fan speed or not resulting in inefficiencies. Conversely, low engine speeds result in a lower fan speed regardless of whether the system cooled by the fan is in need of additional cooling that it might not be provided by the reduced airflow produced by the resultant lower fan speeds. Viscous clutches have been used to help with reducing inefficiencies in applications that experience higher engine speeds than are necessary for driving the cooling fan, but such devices are not helpful for periods of low speed operation since they essentially effect a speed reduction in their coupling mechanism.

Dual drive systems have been proposed wherein a pair of input members of the drive system may be connected in differential rotatable communication with an output member coupled with the fan. A first one of the pair of input members may be operated by the primary engine of the vehicle, and the second one of the pair of input members may be operated by auxiliary means such as by a hydraulic or electric motor.

Dual drive systems have met with some success but they are typically space inefficient because of the need to place the auxiliary motor offset from a connection between the dual drive system and the primary engine of the vehicle supplying power to one of the inputs of the dual drive system.

Systems such as those described above have also been found to be ineffective because they are incapable of reversing the direction of rotation of the output members such as those that might be connected with a fan. The ability to reverse the direction of rotation of the output member of a drive system may be beneficial in some applications and circumstances.

SUMMARY

The embodiments herein provide a variable speed dual path fan drive system that is compact and rugged.

The embodiments herein further provide a variable speed and reversible dual path fan drive system that is compact and rugged.

The embodiments herein further provide a variable speed and reversible on-axis dual path fan drive system that is compact and rugged.

The embodiments herein further provide a variable speed and reversible on-axis dual path fan drive system that is compact and rugged, and that includes a chamber holding lubricating oil for lubricating internal components of a transmission of the drive system.

The embodiments herein further provide a variable speed and reversible on-axis dual path fan drive system that is compact and rugged, and that further incudes a lubrication circuit flowing lubricating oil therethrough for lubricating other components of a transmission of the drive system.

The embodiments herein further provide a compact and rugged variable speed and reversible on-axis dual path on-axis fan drive system in combination with a hydraulic motor in the form of an on-axis gerotor motor.

In accordance with an aspect, a drive system is provided including a transmission and first and second coupling regions for on-axis connection of the transmission with associated sources of power. The transmission includes a housing, an output member rotatable about a longitudinal axis and adapted for communication in driving relation with an associated equipment piece, a first input member rotatable about the axis and adapted for communication in driven relation with an associated first power source, and a second input member rotatable about the axis and adapted for communication in driven relation with an associated second power source. The first and second input members are connected in differentially rotatable communication with the rotatable output member. A first coupling region is defined on the first input member, wherein the first coupling region adapts the drive system for selective connection with the associated first power source on-axis along the longitudinal axis L. In addition, a second coupling region is defined on the second input member, wherein the second coupling region adapts the drive system for selective connection with the associated second power source on-axis along the longitudinal axis.

In accordance with a further aspect, the first coupling region defined on the first input member and the second coupling region defined on the second input member are mutually concentric.

In accordance with an example embodiment, the first and second input members are mutually concentric. In the example embodiment, the first and second input members are disposed on the same side of the housing of the transmission.

In accordance with a further example embodiment wherein the first and second input members are mutually concentric, the first and second input members are both disposed on a side of the housing of the transmission opposite from the associated equipment piece.

In accordance with a further aspect, the first coupling region defined on the first input member and the second coupling region defined on the second input member are mutually coaxial.

In accordance with an example embodiment, the first and second input members are mutually coaxial. In the example embodiment, the first and second input members are disposed on opposite sides of the housing of the transmission.

In accordance with a further example embodiment wherein the first and second input members are mutually coaxial, the first and second input members are disposed on opposite sides of the housing of the transmission wherein the second input member is disposed between the housing of the transmission and the associated equipment piece.

In accordance with a further aspect, the transmission is a planetary gear set including a planet carrier, a ring gear, and a sun gear. The output member is operatively coupled with the planet carrier of the planetary gear set, the first input member is operatively coupled with the ring gear of the planetary gear set, and the second input member is operatively coupled with the sun gear of the planetary gear set.

In accordance with a further aspect, the first input member coupled with the ring gear is operable to be driven by the associated first power source to rotate in a first rotational direction relative to the housing, and the second input member coupled with the sun gear is operable to be driven by the associated second power source to rotate in a second rotational direction opposite the first rotational direction relative to the housing. In that way, the output member coupled with the planet carrier carrying the associated fan is differentially operated by the ring and sun gears to rotate in the second rotational direction relative to the housing.

In accordance with a further aspect, the housing of the transmission defines a chamber configured to hold a volume of an associated lubricious fluid.

In accordance with a further aspect, the drive system further includes a bearing set disposed between the first and second input members. The bearing set supports positioning of the first and second input members relative to each other and guides relative rotational movement between the first and second input members. A lubrication circuit is defined between the first and second input members. The lubrication circuit is configured to route a flow of an associated lubricating fluid between the first and second input members for lubricating and cooling the bearing set.

In accordance with an aspect, a drive system is provided including, in combination, a hydraulic motor and a transmission configured to be coupled with an associated rotatable equipment piece. First and second coupling regions for connection with associated sources of power. The transmission includes a housing, an output member rotatable about a longitudinal axis and adapted for communication in driving relation with the associated equipment piece, a first input member rotatable about the axis and adapted for communication in driven relation with an associated first power source, and a second input member rotatable about the axis and adapted for communication in driven relation with the hydraulic motor. The first and second input members are connected in differentially rotatable communication with the rotatable output member. The first coupling region is defined on the first input member and adapts the drive system for selective connection with the associated first power source on-axis along the longitudinal axis. The second coupling region is defined on the second input member and adapts the drive system for selective connection with the hydraulic motor on-axis along the longitudinal axis.

BRIEF DESCRIPTION OF THE DRAWINGS

In the accompanying drawings which are incorporated in and constitute a part of the specification, example embodiments are illustrated, which, together with the general description of the embodiments given above, and the detailed description given below, serve to exemplify the example embodiments of the claimed invention.

DETAILED DESCRIPTION

The following describes one or more example embodiments of the disclosed variable speed and reversible on-axis dual path fan drive system, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel with the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outwardly from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

The Figures and following descriptions set forth below example embodiments of the disclosed dual path drive system providing a selectively reversible output. It is to be appreciated, however, that the example embodiments are not limited to the particular mechanisms shown, and that various modifications to the claimed embodiments may be contemplated by one of skill in the art including but not limited to modifications that would result in the example embodiments herein and others equivalently.

Figure 1:
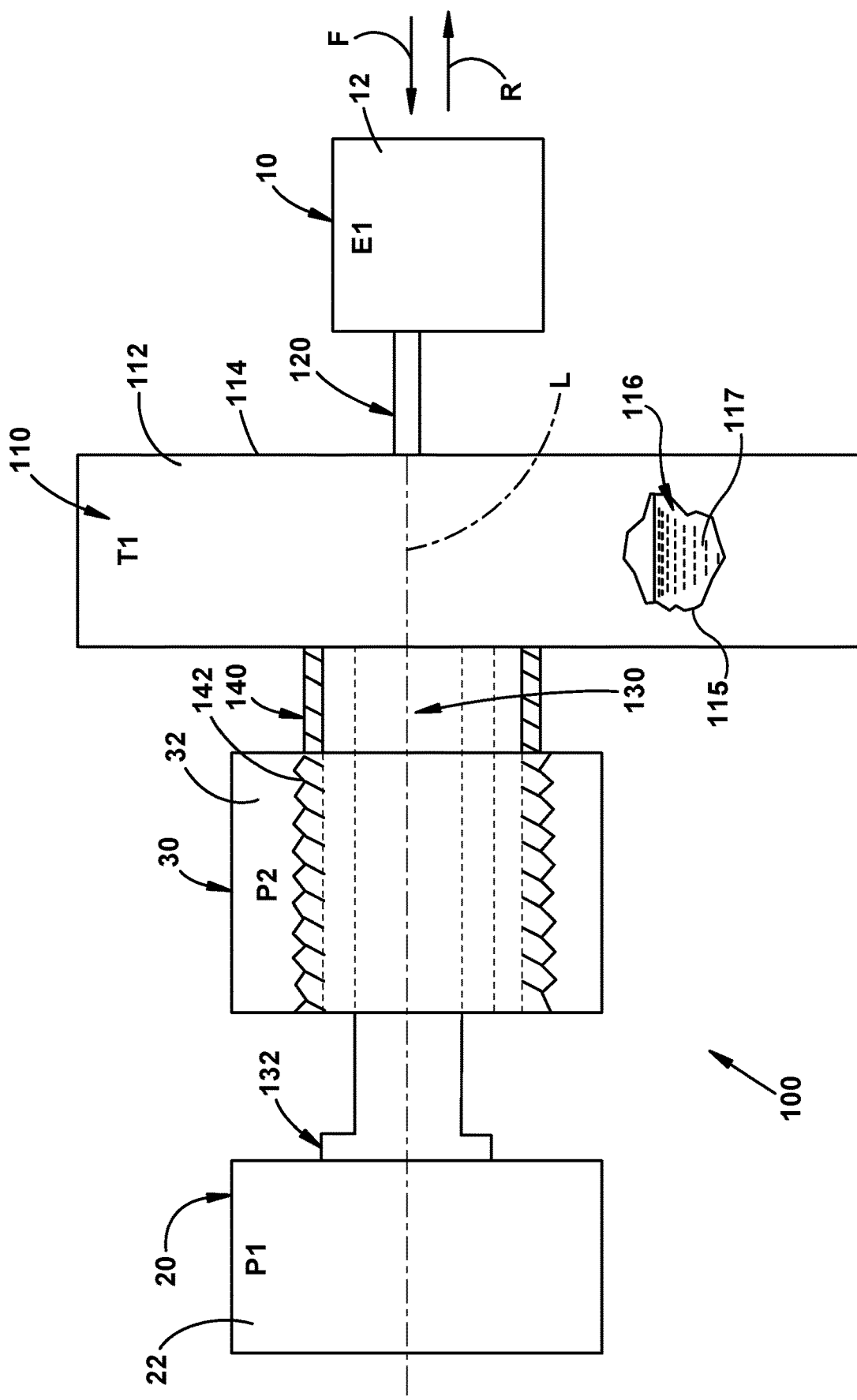
FIG. 1 is a block diagram illustrating an overall component layout as provided by the variable speed and reversible on-axis dual path drive system in accordance with an example embodiment.

With reference now to those Figures wherein the showings are for purposes of describing example embodiments of the dual path drive system only and not for purposes of limiting same, FIG. 1 is a block diagram illustrating a variable speed and reversible dual path drive system 100 in accordance with an example embodiment. The example embodiment enables an on-axis layout of the components of the drive system 100 as well as and in turn an on-axis layout of the various one or more components that are cooperatively operated together with the drive system 100 such as for example one or more associated power sources for driving the system and further such as for example an on-axis layout of one or more associated equipment pieces driven by the system as will be described in greater detail below.

The drive system 100 includes a transmission T1 110 having an output member 120 rotatable about a longitudinal axis L and adapted for communication in driving relation with an associated equipment piece 10. The system 100 further incudes a first input member 130 that is also rotatable about the longitudinal axis L. The first input member 130 is adapted for communication in driven relation with an associated first P1 power source 20. As illustrated, the first input member 130 is located on-axis on the longitudinal axis L. As illustrated, the associated first power source 20 may also be located on-axis on the longitudinal axis L. The system 100 further incudes a second input member 140 rotatable about the longitudinal axis L. The second input member 140 is adapted for communication in driven relation with an associated second P2 power source 30. As illustrated and similar to the first input member 130, the second input member 140 is also located on-axis on the longitudinal axis L. As illustrated and further similar to the associated first power source 20, the associated second power source 30 may also be located on-axis on the longitudinal axis L.

In the example embodiment illustrated, the first and second input members 130, 140 are connected in differentially rotatable communication with the rotatable output member 120 via the transmission 110. A first coupling region 132 is defined on the first input member 130 for receiving rotational power from the first power source 20 into the drive system 100. In the example embodiment, the first coupling region 132 is configured to provide a coupling between the drive system 100 and the first associated power source 20 disposed on-axis on the longitudinal axis L. Similarly, a second coupling region 142 is defined on the second input member 140 for receiving rotational power from the second power source 30 into the drive system 100. In the example embodiment, the second coupling region 142 is configured to provide a coupling between the second associated power source 30 disposed on-axis on the longitudinal axis L. In the example embodiment, the first and second input members 130, 140 are mutually co-linear. In the example embodiment, the first and second input members 130, 140 are mutually co-linear along the longitudinal axis L. In the example embodiment, the second input member 140 is concentric with the first input member 130. The first and second input members 130, 140 are mutually concentric, and the first and second input members 130, 140 each extend along the longitudinal axis L. In the example embodiment, the first input member 130 is essentially located within the second input member 140.

In the example embodiment, the first and second input members 130, 140 are disposed on the same side of the housing 114 of the transmission 110.

In accordance with a further example embodiment wherein the first and second input members 130, 140 are mutually concentric, the first and second input members 130, 140 are both disposed on a side of the housing 114 of the transmission 110 opposite from the associated equipment piece 10.

In accordance with an example embodiment, the first and second input members 130, 140 are mutually coaxial. In accordance with a further example embodiment wherein the first and second input members 130, 140 are mutually coaxial, the first and second input members 130, 140 are both disposed on a side of the housing 114 of the transmission 110 opposite from the associated equipment piece.

The transmission 110 of the example embodiment illustrated comprises a planetary gear set 112 disposed within a housing 114. In the example embodiment, the housing 114 defines a chamber 115 configured to hold a volume of a lubricous fluid 116 such as oil 117 for example, the details of which will be described in greater detail below. Additionally in the example embodiment, the associated equipment piece 10 comprises a fan 12 of an associated work vehicle such as a tractor, for example. Further in addition and in an example embodiment, the associated first power source 20 is prime mover 22 of the associated work vehicle, wherein the prime mover 22 may be an internal combustion engine such as a gas and/or diesel engine, an electric motor, a motor-generator (MG) working power pair or the like. Further in addition in the example embodiment, the associated second power source 30 is a hydraulic input motor such as a gerotor motor 32 receiving a hydraulic fluid from an associated fluid source (not shown) supplying the hydraulic fluid to the gerotor motor 32 in a manner to be described in greater detail below. Further in addition in the example embodiment, the second coupling region 142 of the second input member 140 defines a lubrication circuit 540 (FIGS. 5 and 6) to be described in greater detail below for routing a flow of a lubricating fluid such as for example the hydraulic fluid flowing through the gerotor motor 32 to bearings in the transmission 110 for lubricating and cooling the bearings.

With continued reference to FIG. 1, the dual path drive system 100 in accordance with the example embodiment enables a component layout wherein each of the units supplying power to the drive system 100 may be advantageously arranged on-axis and, in particular, on or otherwise along the longitudinal axis L. That is, the first and second coupling regions 132, 142 of the first and second input members 130, 140 are themselves each disposed on or otherwise along the longitudinal axis L and, in particular, they each rotate about the longitudinal axis L. In addition, the first and second input members 130, 140 are also each disposed on or otherwise along the longitudinal axis L and, in particular, they also each rotate about the longitudinal axis L. Further, the first and second coupling regions 132, 142 of the first and second input members 130, 140 enable each of the associated first and second power sources 20, 30 to also be arranged on-axis or otherwise along the longitudinal axis L. Further, the second coupling region 142 of the second input member 140 is concentric with the first input member 130. In that way, both of the first and second input members 130, 140 are disposed on-axis and, in particular, arranged on the longitudinal axis L.

One benefit of the overall inline layout along the longitudinal axis L enabled by the system 100 of the example embodiment is that it provides an efficient design layout for conserving space and the like. The overall inline layout enabled by the system 100 of the example embodiment also provides for an efficient energy transfer from the first and second associated power sources 20, 30 to the associated equipment piece 10 without introducing any significant transverse torque moments relative to the longitudinal axis L. In addition, the dual path on-axis arrangement of the example embodiment allows for a smaller and therefore more efficient design for more efficient power distribution minimizing wasted power, and for reduced overall size so that the system may be used in a wide range of applications including for example in applications that rotate a fan to move air through a radiator of a work vehicle such as an agricultural or construction vehicle. It is to be appreciated that the descriptions herein are not so limited and that the embodiments have broader application including for example in stationary or portable power equipment and anywhere variable speed and reversible on-axis drive systems would be beneficial.

As described herein, the drive system 100 is a dual path system wherein input power for rotating the output member 120 is sourced from one or both of the associated first and/or second power sources 20, 30. Power is delivered to the first and second input members 130, 140 of the system 100 along dual paths from the associated first and second power sources 20, 30. The power may be delivered to the first and second input members 130, 140 of the system 100 along the dual paths from the associated first and second power sources 20, 30 simultaneously and/or separately. One of the first or second input members 130, 140 of the system 100 may be held fixed while the other of the first or second input members 130, 140 of the system 100 may be driven, and visa-versa. In certain situations or applications both of the first and second input members 130, 140 of the system 100 may be driven along the dual paths from the associated first and second power sources 20, 30 simultaneously.

The associated first power source 20 may drive the associated equipment piece 10 on the rotatable output member 120 differentially relative to the second power source 30 via the transmission 110. Similarly, the associated second power source 30 may drive the associated equipment piece 10 on the rotatable output member 120 via the transmission 110 differentially relative to the first power source 20. The associated first and second power sources 20, 30 may drive the associated equipment piece 10 on the rotatable output member 120 differentially relative to each other via the transmission 110. Beneficially, the associated first and second power sources 20, 30 are arranged by virtue of their connections with the first and second input members 130, 140 via the respective coupling regions 132, 142 to simultaneously differentially drive the associated equipment piece 10 on the rotatable output member 120 via the transmission 110 comprising the planetary gear set 112. In that way and in a manner to be described in greater detail below, the output speed of the drive system 100 is variable, wherein the associated equipment piece 10 on the rotatable output member 120 may be driven by a combined rotational differential motion of the associated first and second power sources 20, 30. The associated first and second power sources 20, 30 may drive the first and second input members 130, 140 via the respective coupling regions 132, 142 simultaneously differentially in different rotational directions.

Under a certain range of circumstances, the associated equipment piece 10 on the rotatable output member 120 may be driven in a forward rotational direction at speeds greater than a rotational speed of the associated prime mover 22 as may be necessary and/or desired such as to generate a large air flow in an inward air flow draw direction F that may be drawn through a cooling radiator on a work vehicle using suitable baffles or the like, by a selected combined rotational motion of the associated first and second power sources 20, 30.

Under a certain other range of circumstances, the associated equipment piece 10 on the rotatable output member 120 may be driven in the forward rotational direction at speeds less than the rotational speed of the associated prime mover 22 as may be necessary and/or desired such as to generate a minimal air flow in the inward air flow draw direction F that may be drawn through the cooling radiator on the work vehicle or the like, by a selected combined rotational motion of the associated first and second power sources 20, 30.

In addition and under a certain further range of circumstances, the associated equipment piece 10 on the rotatable output member 120 may be driven in a reverse rotational direction as may be necessary and/or desired to generate a reverse air flow in a reverse direction R that may be directed at the cooling radiator on the work vehicle or the like, such as to blow chaff off from a cooling radiator on a work vehicle or the like, by a selected combined rotational motion of the associated first and second power sources 20, 30.

Figure 2:
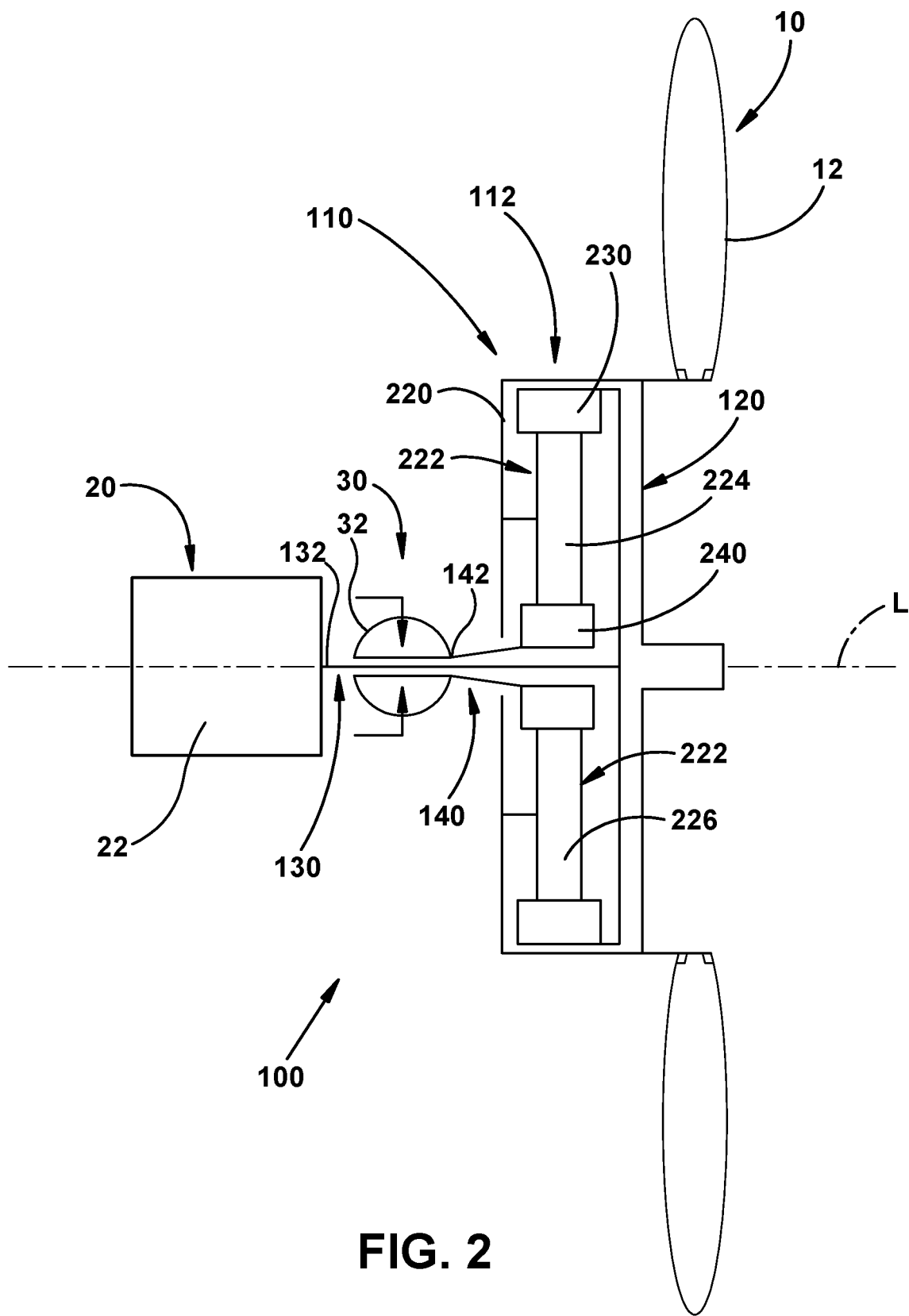
FIG. 2 is a functional schematic diagram of a variable speed and reversible dual path fan drive system in accordance with an example embodiment.

FIG. 2 is a functional schematic diagram of a variable speed and reversible dual path fan drive system 100 in accordance with an example embodiment. With reference now to that Figure, as shown, the transmission 110 comprises a planetary gear set 112. An associated piece of equipment 10 in the form of a fan 12 is carried relative to the transmission 110 for generating an air flow relative to an associated other piece of equipment (not shown) such as, for example, for generating an air flow through an engine radiator. The planetary gear set 112 of the drive system 100 of the example embodiment includes an output member 120. The output member 120 is rotatable about a longitudinal axis L and is adapted for communication in driving relation with the associated fan 12. The planetary gear set 112 of the drive system 100 of the example embodiment further includes a first input member 130 rotatable about the axis L. The first input member 130 is adapted for communication in driven relation with an associated first power source 20. The planetary gear set 112 of the drive system 100 of the example embodiment further includes a second input member 140 rotatable about the axis L. The second input member 140 is adapted for communication in driven relation with an associated second power source 30. In the example embodiment, the first and second input members 130, 140 are connected in differentially rotatable communication with the rotatable output member 120 via gears and other mechanisms of the planetary gear set 112 in a manner to be described in greater detail below.

In the example embodiment, the output member 120 is coupled with a planet carrier 220 of the planetary gear set 112. Also in the example embodiment, the first input member 130 is coupled with a ring gear 230 of the planetary gear set 112. Still further in the example embodiment, the second input member 140 is coupled with a sun gear 240 of the planetary gear set 112. Although there can be any number of planet gears 222, in the example embodiment the system uses three (3) planet gears 222 carried on the planet carrier 220, and though only two (2) such planet gears 224, 226 are shown for clarity of description and ease of illustration.

The first input member 130 of the drive system 100 is rotatable about the longitudinal axis L and is adapted for communication in driven relation with an associated first power source 20. In that way, the ring gear 230 of the planetary gear set 112 may be driven to rotate about the axis L by the associated first power source 20 driving the first input member 130. Similarly, the second input member 140 of the drive system 100 is rotatable about the longitudinal axis L and is adapted for communication in driven relation with an associated second power source 30. In that way, the sun gear 240 of the planetary gear set 112 may be driven to rotate about the longitudinal axis L by the associated second power source 30 driving the second input member 140.

In the example embodiment illustrated, the first and second input members 130, 140 are connected in differentially rotatable communication with the rotatable output member 120 via the transmission 110. In that way, the first and second input members 130, 140 are used to drive the ring and sun gears 230, 240 of the planetary gear set 112. In particular, the first and second input members 130, 140 differentially drive the ring and sun gears 230, 240 of the planetary gear set 112, which has the effect of driving the planet carrier 220 attached with the associated piece of equipment; namely, a fan 12 in the example embodiment. In the example embodiment, therefore, the fan 12 may be driven to rotate forwards in a direction of rotation of the first and second input members 130, 140 based on a differential of the rotation within a selected first differential range of the first and second input members 130, 140. Further in the example embodiment, the fan 12 may be driven to rotate backwards in a direction of rotation opposite that of one or the other of the first and second input members 130, 140 based on a differential of the rotation within a selected second differential range of the first and second input members 130, 140.

In the example embodiment, the fan 12 may be driven to rotate in the same direction of rotation of the first and second input members 130, 140 based on a differential of the rotation within a selected first differential range of the first and second input members 130, 140. Further in the example embodiment, the fan 12 may be driven to rotate in a direction of rotation opposite that of one or the other of the first and second input members 130, 140 based on a differential of the rotation within a selected second differential range of the first and second input members 130, 140.

In an example embodiment, the associated first power source 20 is prime mover 22 of an associated work vehicle, wherein the prime mover 22 may be an internal combustion engine such as a gas and/or diesel engine, an electric motor, a motor-generator (MG) working power pair or the like. Further in addition in the example embodiment, the associated second power source 30 is a hydraulic input motor such as a gerotor motor 32 receiving a hydraulic fluid from a fluid source (not shown) supplying the hydraulic fluid to the gerotor motor 32 in a manner to be described in greater detail below. In further example embodiments, the associated second power source 30 may also be an internal combustion engine such as a gas and/or diesel engine, an electric motor, a motor-generator (MG) working power pair or the like.

In the example embodiment, as noted, the prime mover 22 may be an internal combustion engine such as a gas and/or diesel engine of an associated work vehicle and, accordingly, is not usually operated in a manner to reverse its rotation during use, but rather is typically always operated in a single forward rotational direction. On the other hand, the associated second power source 30 may be a reversible electric motor or preferably, a reversible hydraulic input motor such as the gerotor motor 32 described, which can quite readily be operated in both forward and reverse rotational directions. In this regard and as will be described in greater detail below, the gerotor 32 may include one or more ports for conducting a flow of the hydraulic fluid through the gerotor. A flow of the hydraulic fluid in a first direction through the gerotor motor 32 causes its connection with the second coupling region 142 of the second input member 140 to rotate in a forward rotational direction, and flow of the hydraulic fluid in a second direction through the gerotor motor 32 opposite the first direction causes its connection with the second coupling region 142 of the second input member 140 to rotate in a reverse rotational direction opposite to the forward rotational direction. The flow of the hydraulic fluid through the ports of the gerotor can cause the gerotor to operate in forward or reverse directions. And a lack of flow may cause the gerotor to stop rotation or may be used to lock the gerotor in place.

The system 100 of the example embodiment advantageously uses these features above to effect operations of the associated piece of equipment 10 such as the fan 12 in various modes.

In a first mode of operation, the output member 120 carrying the fan 12 may be operated to rotate faster than engine speed (speed of the prime mover 22) when the gerotor 32 rotates in the same direction as the engine.

In a second mode of operation, the output member 120 carrying the fan 12 may be operated to rotate slower than engine speed (speed of the prime mover 22) when the gerotor 32 rotates in a direction opposite to the rotational direction of the engine.

In a third mode of operation, the output member 120 carrying the fan 12 may be operated to rotate at the same speed as engine speed. A leakage flow through the motor 32 provides for no relative motion of the gerotor output and the input shaft.

In a fourth mode of operation, the output member 120 carrying the fan 12 may be operated to rotate in a direction opposite the rotational direction of the engine (speed of the prime mover 22) when the gerotor 32 rotates in the opposite direction as the engine at a speed to reverse fan rotation direction.

In the embodiment shown in FIG. 2, the second input member 140 supports a connection between the associated second power source 30 and the transmission 110 wherein the associated second power source 30 may be disposed on-axis on the longitudinal axis L between the associated first power source 20 and the transmission 110. In this arrangement, both the first and second input members 130, 140 support connections between the associated first and second power sources 20, 30 and the transmission 110 wherein the associated first and second power sources 20, 30 may both be disposed on-axis on the longitudinal axis L on the same side of the transmission 110.

In the embodiment shown in FIG. 2 the first coupling region 132 defined on the first input member 130 and the second coupling region 142 defined on the second input member 140 are mutually concentric.

In accordance with an example embodiment, the first and second input members 130, 140 are mutually concentric. In the example embodiment, the first and second input members 130, 140 are disposed on the same side of the housing 114 of the transmission 110.

In accordance with a further example embodiment wherein the first and second input members 130, 140 are mutually concentric, the first and second input members 130, 140 are both disposed on a side of the housing 114 of the transmission 110 opposite from the associated equipment piece.

In accordance with an example embodiment, the first and second input members 130, 140 are mutually coaxial.

Figure 3:
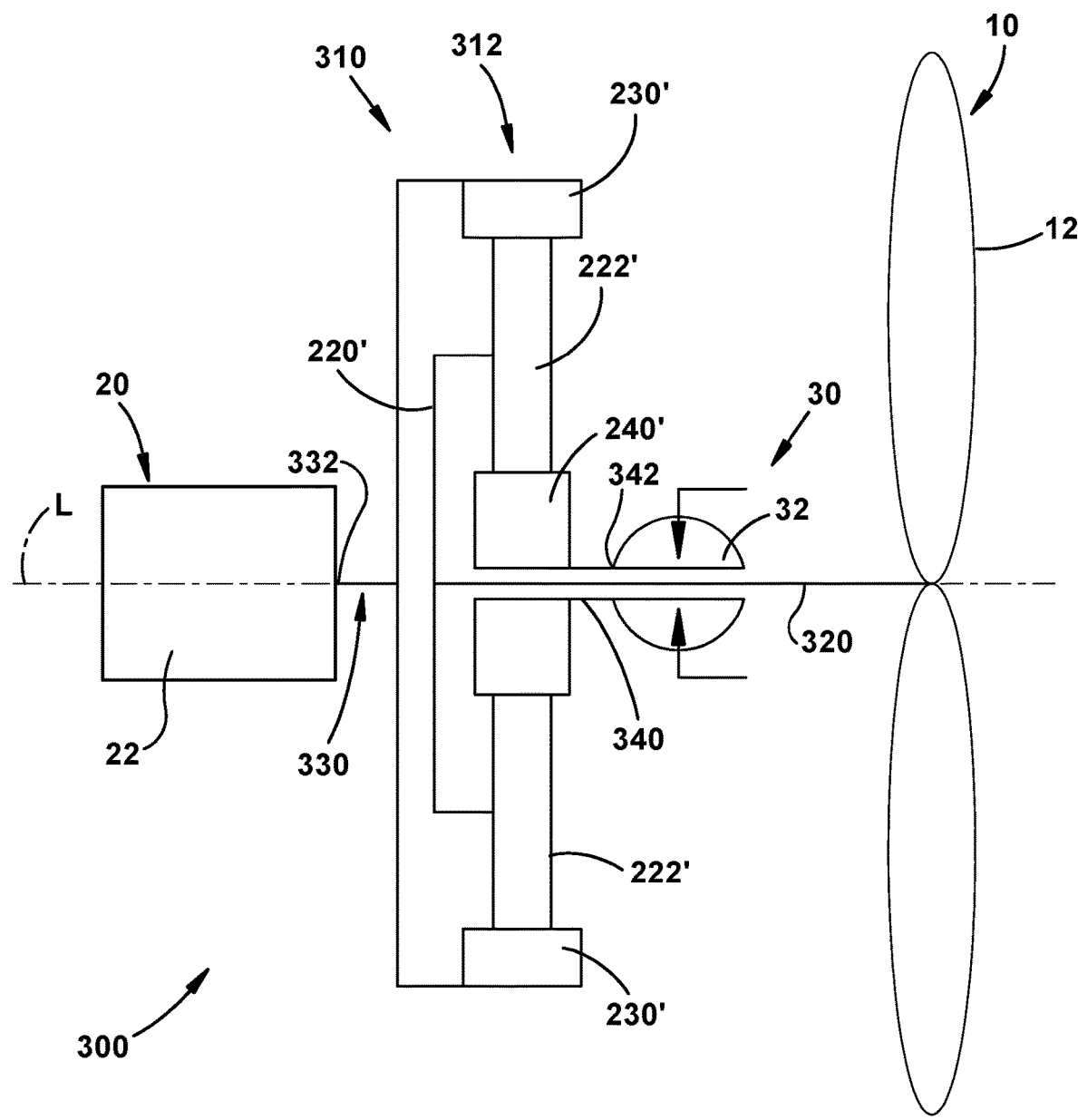
FIG. 3 is a functional schematic diagram of a variable speed and reversible dual path fan drive system in accordance with an example embodiment.

FIG. 3 is a functional schematic diagram of a variable speed and reversible dual path fan drive system 300 in accordance with a further example embodiment. In the embodiment shown in FIG. 3, a second input member 340 supports a connection between the associated second power source 30 and a transmission 310 wherein the associated second power source 30 may be disposed on-axis on the longitudinal axis L on a side of the transmission 310 opposite from the associated first power source 20. In this arrangement, both the first and second input members 330, 340 support connections between the associated first and second power sources 20, 30 and the transmission 310 wherein the associated first and second power sources 20, 30 may both be disposed on-axis on the longitudinal axis L on opposite sides of the transmission 310.

In the embodiment shown in FIG. 3 a first coupling region 332 is defined on the first input member 330 and a second coupling region 342 is defined on the second input member 340 are mutually coaxial. A first coupling region 332 is defined on the first input member 330 for receiving rotational power from the first power source 20 into the drive system 300. In the example embodiment, the first coupling region 332 is configured to provide a coupling between the drive system 300 and the first associated power source 20 disposed on-axis on the longitudinal axis L. Similarly, a second coupling region 342 is defined on the second input member 340 for receiving rotational power from the second power source 30 into the drive system 300. In the example embodiment, the second coupling region 342 is configured to provide a coupling between the second associated power source 30 disposed on-axis on the longitudinal axis L. In the example embodiment, the first and second input members 330, 340 are mutually co-linear. In the example embodiment, the first and second input members 330, 340 are mutually co-linear along the longitudinal axis L. In the example embodiment, the second input member 340 is concentric with the output member 320. The first and second input members 330, 340 are mutually co-linear and the first and second input members 330, 340 each extend along the longitudinal axis L. In the example embodiment, the output member 320 is essentially located within the second input member 340.

In accordance with an example embodiment, the first and second input members 330, 340 are mutually coaxial. In the example embodiment, the first and second input members 330, 340 are disposed on opposite sides of the housing 114 of the transmission 110, wherein the second input member 340 is disposed between the housing 114 of the transmission 110 and the associated equipment piece 10.

As shown, the transmission 310 comprises a planetary gear set 312. An associated piece of equipment 10 in the form of a fan 12 is carried relative to the transmission 310 for generating an air flow relative to an associated other piece of equipment (not shown) such as, for example, for generating an air flow through an engine radiator. The drive system 300 of the example embodiment includes a planetary gear set 312 having an output member 320 rotatable about a longitudinal axis L and adapted for communication in driving relation with the associated fan 12, a first input member 330 rotatable about the axis L and adapted for communication in driven relation with an associated first power source 20, and a second input member 340 rotatable about the axis L and adapted for communication in driven relation with an associated second power source 30. In the example embodiment, the first and second input members 330, 340 are connected in differentially rotatable communication with the rotatable output member 320 via the gears and other mechanisms of the planetary gear set.

In the example embodiment, the output member 320 is coupled with a planet carrier 220' of the planetary gear set 312, the first input member 330 is coupled with a ring gear 230' of the planetary gear set 312, and the second input member 340 is coupled with a sun gear 240' of the planetary gear set 312. Although there can be any number of planet gears 222', in the example embodiment the system uses three (3) planet gears 222' carried on the planet carrier 220', and though only two (2) such planet gears 224', 226' are shown for clarity of description and ease of illustration.

The first input member 330 of the drive system 300 is rotatable about the longitudinal axis L and is adapted for communication in driven relation with an associated first power source 20. In that way, the ring gear 230' of the planetary gear set 312 may be driven to rotate about the axis L by the associated first power source 20 driving the first input member 330. Similarly, the second input member 340 of the drive system 300 is rotatable about the longitudinal axis L and is adapted for communication in driven relation with an associated second power source 30. In that way, the sun gear 240' of the planetary gear set 312 may be driven to rotate about the longitudinal axis L by the associated second power source 30 driving the second input member 340.

In the example embodiment illustrated, the first and second input members 330, 340 are connected in differentially rotatable communication with the rotatable output member 320 via the transmission 310. In that way, the first and second input members 330, 340 are used to drive the ring and sun gears 230', 240' of the planetary gear set 312. In particular, the first and second input members 330, 340 differentially drive the ring and sun gears 230', 240' of the planetary gear set 312, which has the effect of driving the planet carrier 220' attached with the associated piece of equipment; namely, a fan 12 in the example embodiment. In the example embodiment, therefore, the fan 12 may be driven to rotate forwards in a direction of rotation of the first and second input members 330, 340 based on a differential of the rotation within a selected first differential range of the first and second input members 330, 340. Further in the example embodiment, the fan 12 may be driven to rotate backwards in a direction of rotation opposite that of one or the other of the first and second input members 330, 340 based on a differential of the rotation within a selected second differential range of the first and second input members 330, 340.

In an example embodiment, the associated first power source 20 is prime mover 22 of an associated work vehicle, wherein the prime mover 22 may be an internal combustion engine such as a gas and/or diesel engine, an electric motor, a motor-generator (MG) working power pair or the like. Further in addition in the example embodiment, the associated second power source 30 is a hydraulic input motor such as a gerotor motor 32 receiving a hydraulic fluid from a fluid source (not shown) supplying the hydraulic fluid to the gerotor motor 32 in a manner to be described in greater detail below. In further example embodiments, the associated second power source 30 may also be an internal combustion engine such as a gas and/or diesel engine, an electric motor, a motor-generator (MG) working power pair or the like.

In the example embodiment, as noted, the prime mover 22 may be an internal combustion engine such as a gas and/or diesel engine of an associated work vehicle and, accordingly, is not usually operated in reverse rotation but rather is typically always operated in a forward rotation direction. On the other hand, the associated second power source 30 may be an electric motor or preferably, a hydraulic input motor such as the gerotor motor 32 described, which can quite readily be operated in a reverse rotational direction. In this regard and as will be described in greater detail below, the gerotor 32 may include one or more ports for conducting a flow of the hydraulic fluid through the gerotor. A flow of the hydraulic fluid in a first direction through the gerotor motor 32 causes its connection with the second coupling region 342 of the second input member 340 to rotate in a forward rotational direction, and flow of the hydraulic fluid in a second direction through the gerotor motor 32 opposite the first direction causes its connection with the second coupling region 342 of the second input member 340 to rotate in a reverse rotational direction. The flow of the hydraulic fluid through the ports of the gerotor can cause the gerotor to operate in forward or reverse directions. And a lack of flow may cause the gerotor to stop rotation.

The system 300 of the example embodiment advantageously uses these features above to effect operations of the associated piece of equipment 10 such as the fan 12 in various modes.

In a first mode of operation, the output member 320 carrying the fan 12 may be operated to rotate faster than engine speed (speed of the prime mover 22) when the gerotor 32 rotates in the same direction as the engine.

In a second mode of operation, the output member 320 carrying the fan 12 may be operated to rotate slower than engine speed (speed of the prime mover 22) when the gerotor 32 rotates in the opposite direction as the engine.

In a third mode of operation, the output member 320 carrying the fan 12 may be operated to rotate at the same speed as engine speed. A leakage flow through the motor 32 provides for no relative motion of the gerotor output and the input shaft.

In a fourth mode of operation, the output member 320 carrying the fan 12 may be operated to rotate in a direction opposite the rotational direction of the engine (speed of the prime mover 22) when the gerotor 32 rotates in the opposite direction as the engine at a speed to reverse fan rotation direction.

Figure 4:
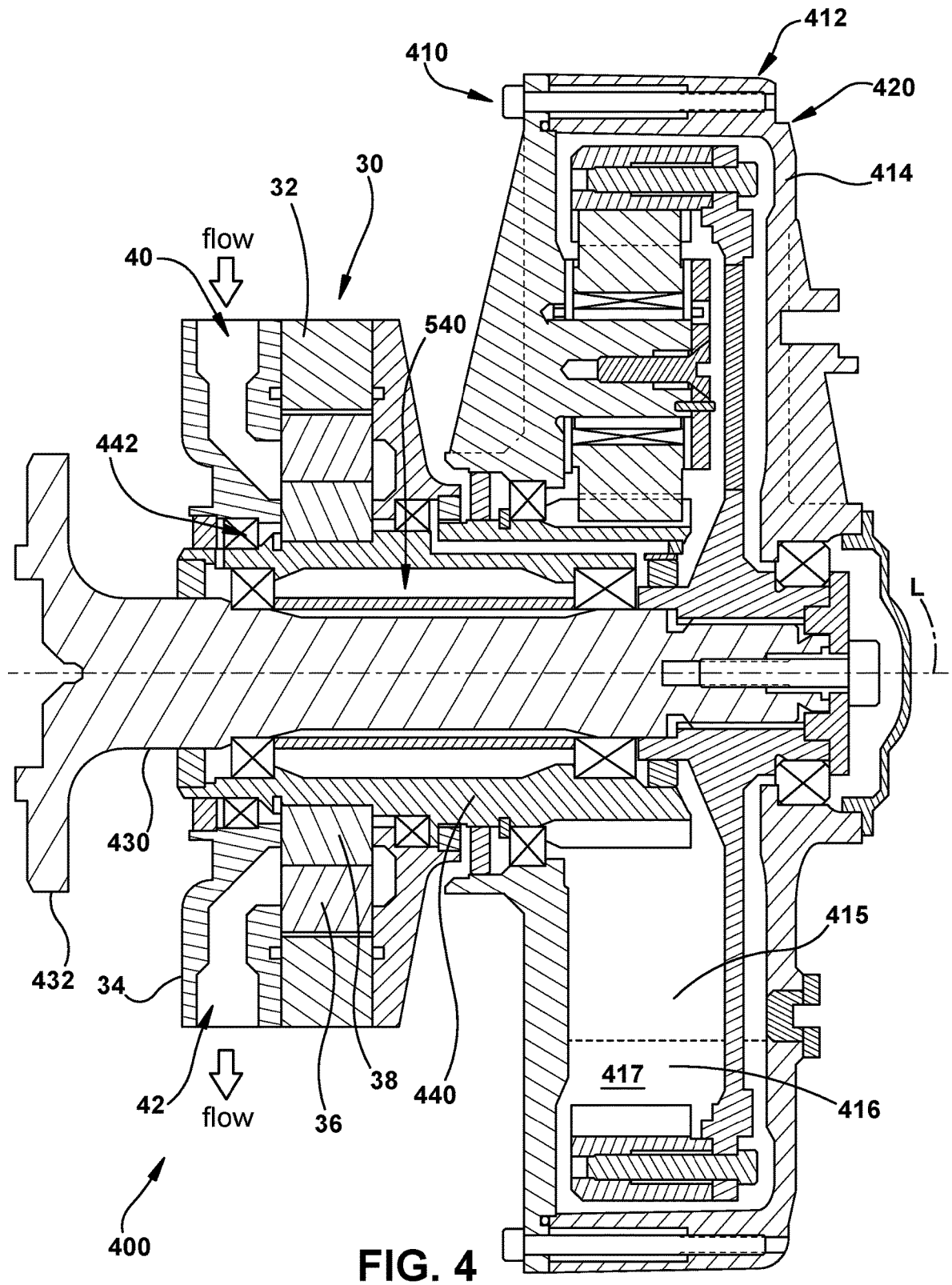
FIG. 4 is a view in partial cross section of a variable speed and reversible dual path fan drive system in accordance with an example embodiment.

FIG. 4 is a view in partial cross section of a variable speed and reversible dual path fan drive system 400 in accordance with a particular example embodiment. With reference now to that Figure, the drive system 400 includes a transmission 410 having an output member 420 rotatable about a longitudinal axis L and adapted for communication in driving relation with an associated equipment piece (not shown). The system 400 further incudes a first input member 430 that is also rotatable about the longitudinal axis L. The first input member 430 is adapted for communication in driven relation with an associated first power source (not shown) that may be located on-axis on the longitudinal axis L. The system 400 further incudes a second input member 440 rotatable about the longitudinal axis L. The second input member 440 is adapted for communication in driven relation with an associated second power source 30. As illustrated and similar to the associated first power source, the associated second power source 30 is located on-axis on the longitudinal axis L.

In the example embodiment illustrated, the first and second input members 430, 440 are connected in differentially rotatable communication with the rotatable output member 420 via the transmission 410. A first coupling region 432 is defined on the first input member 430 for receiving rotational power from the first power source into the drive system 400. In the example embodiment, the first coupling region 432 is configured to provide a coupling between the drive system 400 and the first associated power source disposed on-axis on the longitudinal axis L. Similarly, a second coupling region 442 is defined on the second input member 440 also for receiving rotational power from the second power source 30 into the drive system 400. In the example embodiment, the second coupling region 442 is configured to provide a coupling between the second associated power source 30 disposed on-axis on the longitudinal axis L. In the example embodiment, the second input member 440 is concentric with the first input member 430. The first and second input members 430, 440 are mutually concentric, and the first and second input members 430, 440 each extend along the longitudinal axis L. In the example embodiment, the first input member 430 is essentially located within the second input member 440. In the example embodiment, the first and second input members 430, 440 are disposed on the same side of the housing 114 of the transmission 410.

In accordance with a further example embodiment wherein the first and second input members 430, 440 are mutually concentric, the first and second input members 430, 440 are both disposed on a side of the housing 114 of the transmission 110 opposite from the associated equipment piece.

In accordance with an example embodiment, the first and second input members 430, 440 are mutually coaxial. In accordance with a further example embodiment wherein the first and second input members 430, 440 are mutually coaxial, the first and second input members 430, 440 are both disposed on a side of the housing 114 of the transmission 110 opposite from the associated equipment piece.

The transmission 410 of the example embodiment illustrated comprises a planetary gear set 412 disposed within a housing 414. In the example embodiment, the housing 414 defines a chamber 415 configured to hold a volume of a lubricous fluid 416 such as oil 417 for example, the details of which will be described in greater detail below. Additionally in the example embodiment, the associated second power source 30 is a hydraulic input motor such as a gerotor motor 32 receiving a hydraulic fluid from an associated fluid source (not shown) supplying the hydraulic fluid to the gerotor motor 32 in a manner to be described in greater detail below. The gerotor motor 32 includes a housing 34, an outer rotor 36, and an inner rotor 38. The inner rotor 38 is attached with the second input member 440 at the second coupling regions 442 such by using splines or the like. The inner and outer rotors 38, 36 are driven relative to each other by the flow of a hydraulic fluid through the gerotor motor 32. A first gerotor motor port 40 may receive a flow of the hydraulic fluid into the gerotor motor 32, and second gerotor motor port 42 may expel the flow of the hydraulic fluid from the gerotor motor 32. Flow of the hydraulic fluid through the gerotor motor 32 in this direction may cause relative rotation between the inner and outer rotors 38, 36 causing a corresponding rotation of the second input member 440 in a first rotational direction. Conversely, a flow of the hydraulic fluid through the gerotor motor 32 in the opposite direction such as to flow from the second gerotor motor port 42 to the first gerotor motor port 40, causes relative rotation between the inner and outer rotors 38, 36 in an opposite direction of rotation urging the second input member 440 in the same opposite rotational direction.

Further in addition in the example embodiment, the second coupling region 442 of the second input member 440 defines a lubrication circuit 540 to be described in greater detail below for routing a flow of a lubricating fluid such as for example the hydraulic fluid flowing through the gerotor motor 32 to bearings in the transmission 410 for lubricating and cooling the bearings.

With continued reference to FIG. 4, the dual path drive system 400 in accordance with the example embodiment enables a component layout wherein each of the units supplying power to the drive system 400 may be advantageously arranged on-axis and, in particular, on or otherwise along the longitudinal axis L. That is, the first and second coupling regions 432, 442 of the first and second input members 430, 440 are themselves each disposed on or otherwise along the longitudinal axis L and, in particular, they each rotate about the longitudinal axis L. Further, the first and second coupling regions 432, 442 of the first and second input members 430, 440 enable each of the associated first and second power sources to also be arranged on-axis or otherwise along the longitudinal axis L. Further, the second coupling region 442 of the second input member 440 is concentric with the first input member 430. In that way, both of the first and second input members 430, 440 and their respective first and second coupling regions 432, 442 are disposed on-axis and, in particular, arranged on the longitudinal axis L.

One benefit of the overall inline layout enabled by the system 400 of the example embodiment is that it provides an efficient design layout for conserving space and the like. The overall inline layout enabled by the system 400 of the example embodiment also provides for an efficient energy transfer from the first and second associated power sources to the associated equipment piece without introducing any significant transverse torque moments relative to the longitudinal axis L. In addition, the dual path on-axis arrangement of the example embodiment allows for a smaller and therefore more efficient design for more efficient power distribution minimizing wasted power, and for reduced overall size so that the system may be used in a wide range of applications including for example in applications the rotate a fan to move air through a radiator of a work vehicle such as an agricultural or construction vehicle. It is to be appreciated that the descriptions herein are not so limited and that the embodiments have broader application including for example in stationary or portable power equipment and anywhere variable speed and reversible on-axis drive systems would be beneficial.

As described herein, the drive system 400 is a dual path system wherein input power for rotating the output member 420 is sourced from one or both of the associated first and/or second power sources. Power is delivered to the first and second input members 430, 440 of the system 400 along dual paths from the associated first and second power sources. The associated first power source drives the associated equipment piece on the rotatable output member 420 differentially relative to the second power source 30 via the transmission 410. Similarly, the associated second power source 30 drives the associated equipment piece on the rotatable output member 420 via the transmission 410 differentially relative to the first power source. Beneficially, the associated first and second power sources are arranged by virtue of their connections with the first and second input members 430, 440 via the respective coupling regions 432, 442 to simultaneously differentially drive the associated equipment piece on the rotatable output member 420 via the transmission 410 comprising the planetary gear set 412. In that way and in a manner to be described in greater detail below, the output speed of the drive system 400 is variable, wherein the associated equipment piece on the rotatable output member 420 may be driven by a combined rotational differential motion of the associated first and second 30 power sources.

Under a certain range of circumstances, the associated equipment piece on the rotatable output member 420 may be driven in a forward rotational direction at speeds greater than a rotational speed of the associated prime mover as may be necessary and/or desired such as to generate a large air flow in an inward air flow draw direction that may be drawn through a cooling radiator on a work vehicle using suitable baffles or the like, by a selected combined rotational motion of the associated first and second 30 power sources.

Under a certain other range of circumstances, the associated equipment piece on the rotatable output member 420 may be driven in the forward rotational direction at speeds less than the rotational speed of the associated prime mover as may be necessary and/or desired such as to generate a minimal air flow in the inward air flow draw direction that may be drawn through the cooling radiator on the work vehicle or the like, by a selected combined rotational motion of the associated first and second power sources.

In addition and under a certain further range of circumstances, the associated equipment piece on the rotatable output member 420 may be driven in a reverse rotational direction as may be necessary and/or desired to generate a reverse air flow in a reverse direction that may be directed at the cooling radiator on the work vehicle or the like, such as to blow chaff off from a cooling radiator on a work vehicle or the like, by a selected combined rotational motion of the associated first and second power sources.

Figure 5:
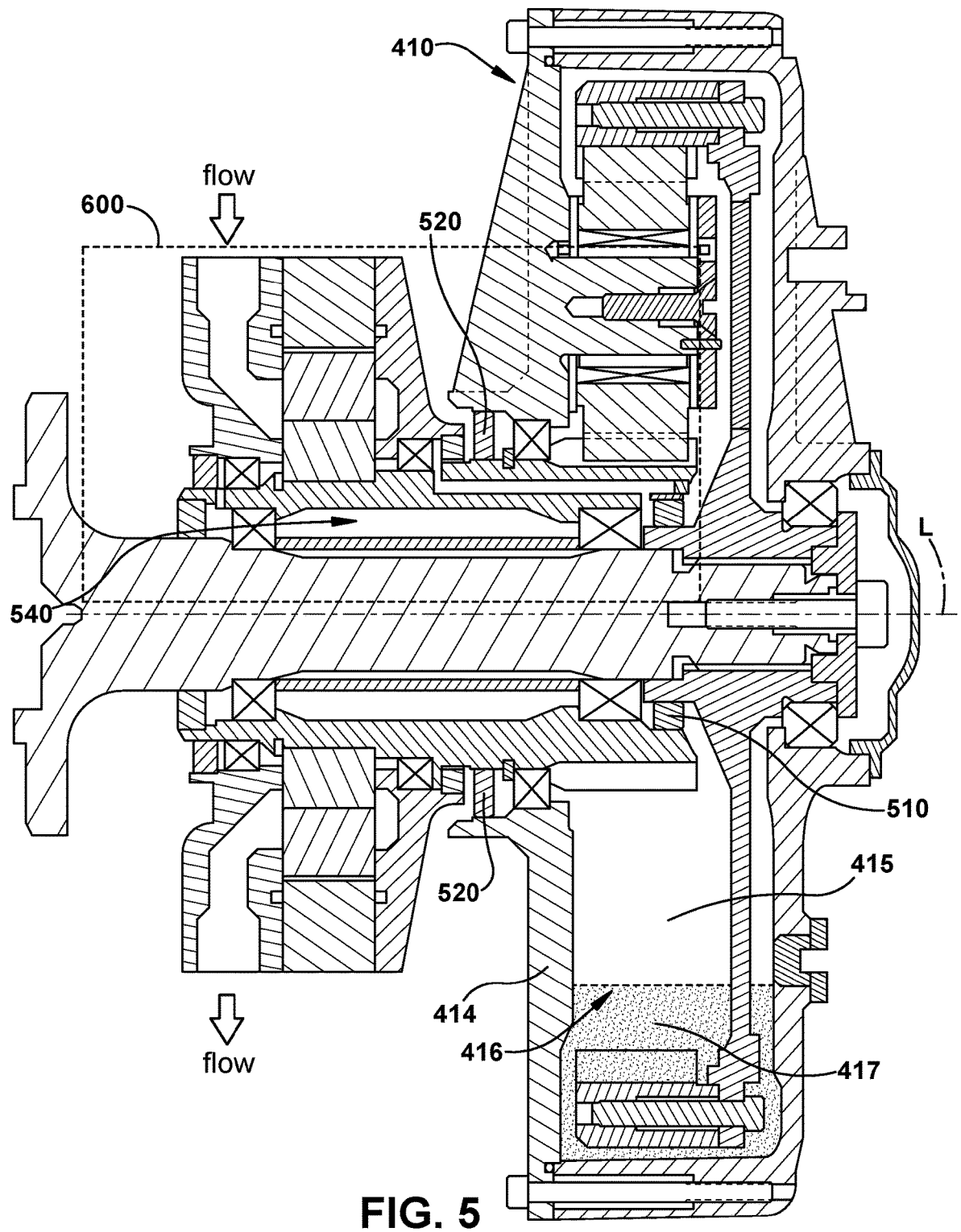
FIG. 5 is a view in partial cross section of the variable speed and reversible dual path fan drive system of FIG. 4 showing a chamber defined by a housing of a transmission holding oil for providing lubrication to components of the transmission in accordance with an example embodiment.

FIG. 5 is a view in partial cross section of the variable speed and reversible dual path fan drive system of FIG. 4 showing a chamber 415 defined by the housing 414 of the transmission 410 holding oil 417 or other lubricious fluid 416 for providing lubrication to components of the transmission in accordance with an example embodiment. As shown and in accordance with an example embodiment, the housing 414 of the transmission 410 defines a chamber 415 configured to hold a volume of an associated lubricious fluid 416. A first seal member 510 is disposed between the first and second input members 430, 440. In addition, a housing seal member 520 is further disposed between the second input member 140 and the housing 414 of the transmission 410. In that way, the first seal member 510 and the housing seal member 520 cooperatively prevent a flow of associated lubricious fluid 416 out from the chamber 415 of the housing 414. The oil 417 provides lubrication to components of the transmission in accordance with an example embodiment.

Figure 6:
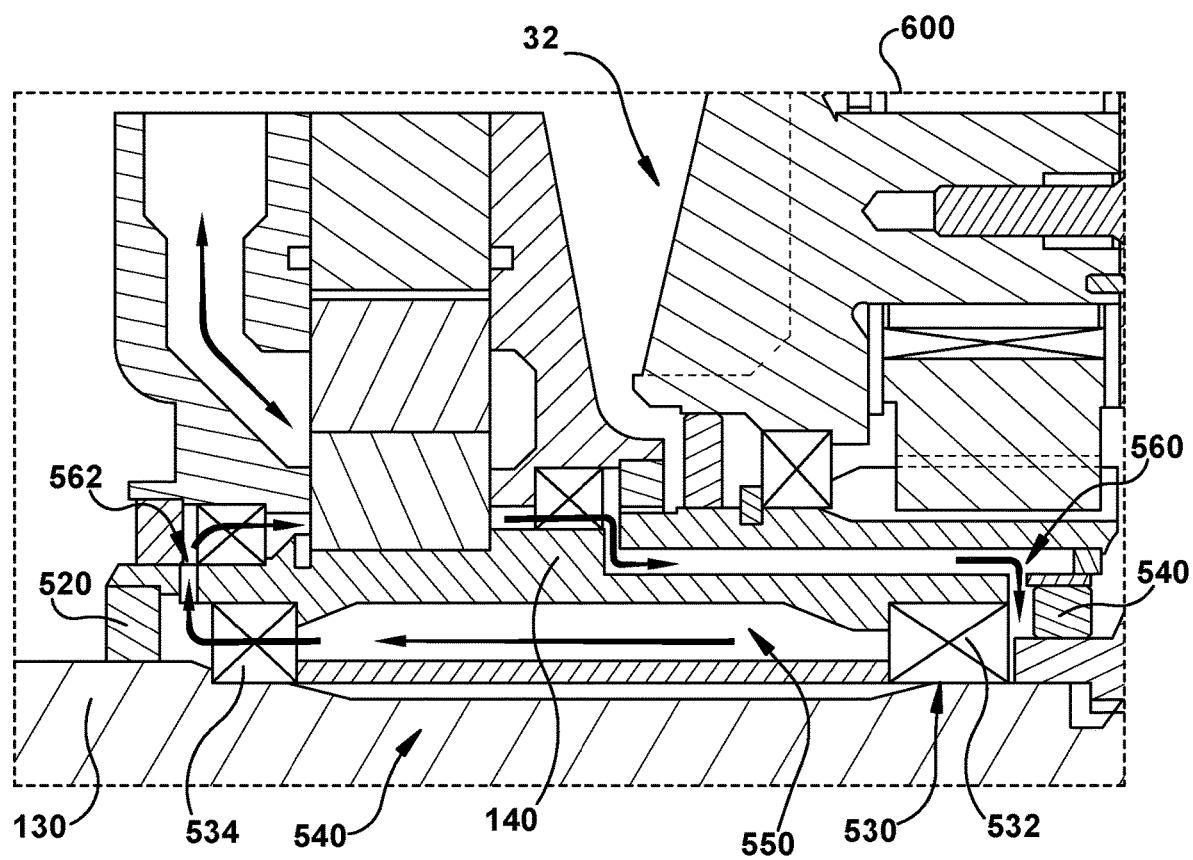
FIG. 6 an enlarged view of a portion of the variable speed and reversible dual path fan drive system of FIG. 5 showing a lubrication circuit for providing lubrication to components of the transmission in accordance with an example embodiment.

FIG. 6 an enlarged view of a portion 600 of the variable speed and reversible dual path fan drive system of FIG. 5 showing a lubrication circuit 540 for providing lubrication to components of the transmission in accordance with an example embodiment. A bearing set 530 is disposed between the first and second input members 130, 140. The bearing set 530 supporting positioning of the first and second input members 130, 140 relative to each other and guiding relative rotational movement between the first and second input members 130, 140.

In accordance with the example embodiment, the lubrication circuit is 540 defined between the first and second input members 130, 140. The lubrication circuit 540 is configured to route a flow of an associated lubricating fluid between the first and second input members 130, 140 for lubricating and cooling the bearing set 530.

As described above, the first and second input members 130, 140 of the drive system 110 are coaxially arranged in accordance with an example embodiment. In this regard, the bearing set 530 comprises a first bearing member 532 disposed between the first and second input members 130, 140 on one end of the first input member 130, and a second bearing member 534 disposed between the first and second input members 130, 140 on the other end of the first input member 130. The first and second bearing members 532, 534 are spaced apart along the longitudinal axis L defining a space portion 550 of the lubrication circuit 540 between each other and between the first and second input members 130, 140.

In addition, the second input member 130 defines an input port 560 of the lubrication circuit 540 configured to receive the associated lubricating fluid into the space portion 550 of the lubrication circuit 540 between the first and second input members 130, 140, and an exit port 562 of the lubrication circuit 540 configured to expel the associated lubricating fluid from the space portion 550 of the lubrication circuit 540 between the first and second input members 130, 140.

As shown, the first and second bearing members 532, 534 are disposed along the longitudinal axis L between the input and exit ports 560, 562.

Further as shown, first and second seal members 510, 512 are disposed between the first and second input members 130, 140. The first seal member 510 is disposed between the first and second input members 130, 140 on a side of the input port 560 opposite the first bearing member 532 along the longitudinal axis L. The second seal member 512 is disposed between the first and second input members 130, 140 on a side of the exit port 562 opposite the second bearing member 534 along the longitudinal axis L.

Further in addition, first and second gerotor seal members 570, 572 are disposed between the second input member 140 and the associated second power source comprising a gerotor motor 32. In the example embodiment, the first and second gerotor seal members 570, 572 seal a flow of the associated lubricating fluid between the lubrication circuit 540 and the associated gerotor 32.

Figure 7:
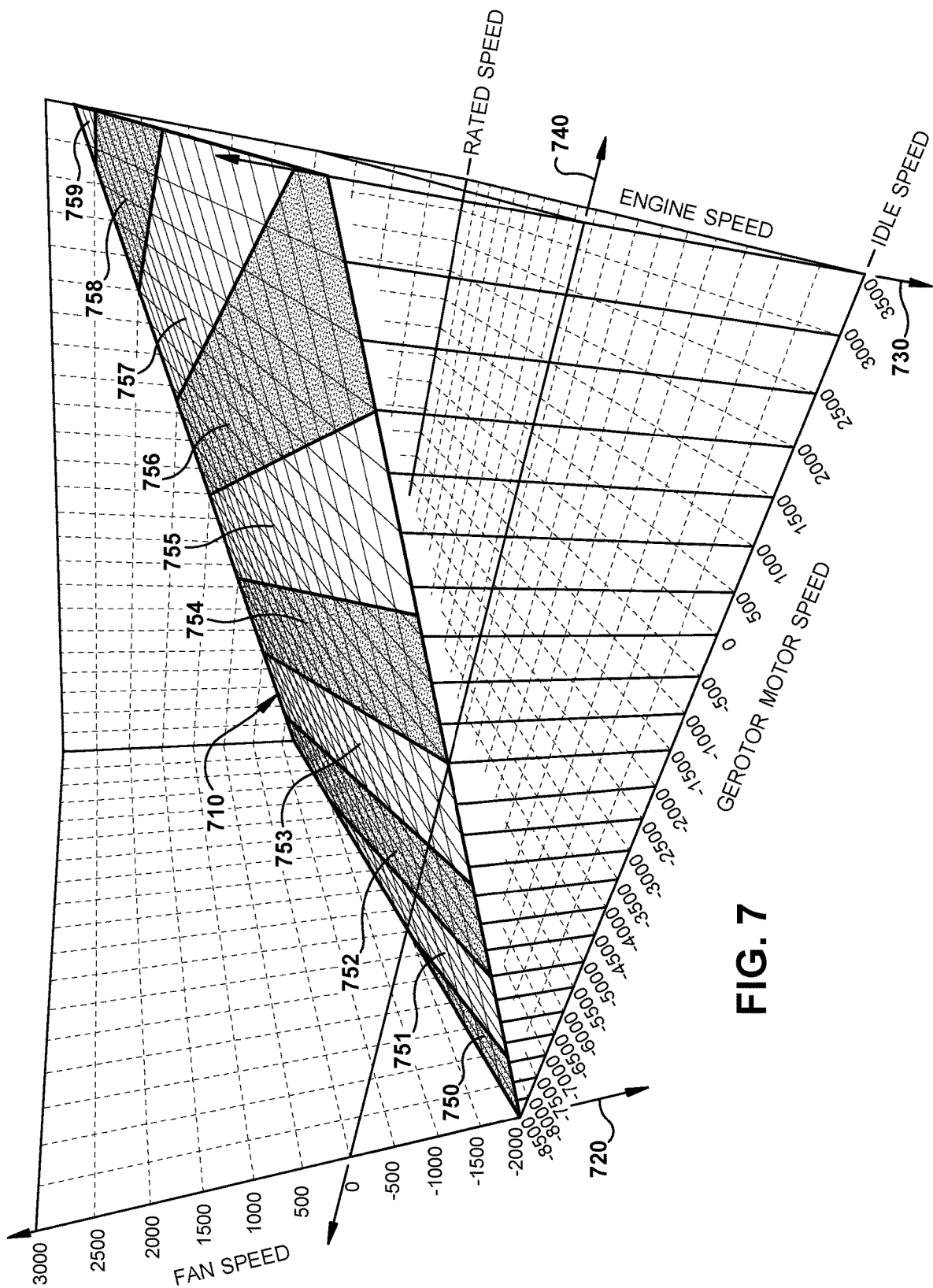
FIG. 7 is a graph showing a functional operational plane within which the variable speed and reversible dual path fan drive system in accordance with the example embodiments may operate illustrating a relationship in three dimensions between the rotating speeds of differentially rotatable first and second input members and a resultant rotating speed of an output member of the system.

FIG. 7 is a graph 700 showing a functional operational plane 710 within which the variable speed and reversible dual path fan drive system in accordance with the example embodiments may operate. The graph 700 illustrates a relationship in three dimensions (3-D) between the rotating speeds of differentially rotatable first input member 130, 330, 430 and the second 140, 340, 440 input member, and a resultant rotating speed of an output member 120, 320, 420 of the system. With reference now to that Figure, a fan speed axis 720 is illustrated in a vertical direction as viewed on the page. The fan speed axis 720 is representative of the range of the rotating speed of the output member 120, 320, 420 of the system attached for example with an associated equipment piece 10 such as for example a fan 12 resulting from the differential driving speeds of the rotatable first and second input members. In the example shown, the output member attached with the fan may be driven in a first direction from no rotation (0 RPM) to about 2,000 RPM. The fan speed axis therefore shows that the output member attached with the fan is reversible and the scale of the axis 720 ranges from −2,000 RPM (first direction) to 3,000 RPM (second direction).

An engine speed axis 730 is illustrated in an oblique direction extending vertically and into and out from the page as viewed. The engine speed axis 730 is representative of the range of the rotating speed of the first input member 130, 330, 430 of the system attached for example with an associated first power source 20 such as a prime mover 22 of an associated work vehicle, wherein the prime mover 22 may be an internal combustion engine such as a gas and/or diesel engine, an electric motor, a motor-generator (MG) working power pair or the like. In the example, the scale of the engine speed axis 730 ranges from an Idle Speed to a Rated Speed. By way of example, the engine idle speed may be, in accordance with an application of the subject drive system, about 900 RPM, and the rated speed may be, in accordance with the application of the subject drive system, about 5,000 RPM. By way of a further example, the engine idle speed may be, in accordance with a further example application of the subject drive system, about 600 RPM, and the rated speed may be, in accordance with the further application of the subject drive system, about 2,600 RPM.

A gerotor motor speed axis 740 is illustrated in an oblique direction extending horizontally and into and out from the page as viewed. The gerotor motor speed axis 740 is representative of the range of the rotating speed of the second input member 140, 340, 440 of the system attached for example with an associated second power source 30 such as a hydraulic input motor such as a gerotor motor 32 receiving a hydraulic fluid from an associated fluid source (not shown) supplying the hydraulic fluid to the gerotor motor 32 in a manner as described above. In the example shown, the second input member 140, 340, 440 of the system may be driven in a first direction from no rotation (0 RPM) to about 3,500 RPM, and the second input member 140, 340, 440 of the system may be driven in a second direction from no rotation (0 RPM) to about −8,500 RPM. The gerotor motor speed axis 740 therefore shows that the second input member 140, 340, 440 of the system is reversible and the scale of the axis 740 ranges from 3,500 RPM (first direction) to −8,500 RPM (second direction).

As described above, the associated first power source 20 may drive the associated equipment piece 10 on the rotatable output member 120 differentially relative to the second power source 30 via the transmission 110. Similarly, the associated second power source 30 may drive the associated equipment piece 10 on the rotatable output member 120 via the transmission 110 differentially relative to the first power source 20. The associated first and second power sources 20, 30 may drive the associated equipment piece 10 on the rotatable output member 120 differentially relative to each other via the transmission 110. Beneficially, the associated first and second power sources 20, 30 are arranged by virtue of their connections with the first and second input members 130, 140 via the respective coupling regions 132, 142 to simultaneously differentially drive the associated equipment piece 10 on the rotatable output member 120 via the transmission 110 comprising the planetary gear set 112. In that way and in a manner as described above, the output speed of the drive system 100 is variable, wherein the associated equipment piece 10 on the rotatable output member 120 may be driven by a combined rotational differential motion of the associated first and second power sources 20, 30. The associated first and second power sources 20, 30 may drive the first and second input members 130, 140 via the respective coupling regions 132, 142 simultaneously differentially in different rotational directions.

In the example embodiment, each combination of an engine speed operational point selected on the engine speed axis 730 together with a gerotor motor operational point selected on the gerotor motor speed axis 740 results in a point on the fan speed axis 720 that is representative of the resultant rotating speed of the output member 120, 320, 420 of the system attached for example with an associated equipment piece 10 such as for example a fan 12. In the example embodiment, the differential driving speeds of the rotatable first and second input members comprises a locus of points defining the functional operational plane 710 within which the variable speed and reversible dual path fan drive system in accordance with the example embodiments may operate.

Further in accordance with the example embodiment, a point on the fan speed axis 720 that is representative of the resultant rotating speed of the output member 120, 320, 420 of the system attached for example with the fan 12 may be controlled for any given engine speed on the engine speed axis 730 by controlling the rotational speed of the gerotor motor. For example, at engine idle speed, the fan may be driven to draw air through an associated radiator or the like by controlling the gerotor motor to operate in the range of about −1,500 to about 3,500 RPM. Similarly and by way of further example, at engine idle speed, the fan may be driven in reverse such as for example to blow chaff off from a cooling radiator on a work vehicle or the like, by controlling the gerotor motor to operate in the range of about −2000 to −8,500 RPM.

The functional operational plane 710 may be divided into fan speed operation bands wherein a first fan speed operating band 750 is representative of an operation of the output member coupled with the fan of about −2,000 RPM to about −1,500 RPM.

A second fan speed operating band 751 is representative of an operation of the output member coupled with the fan of about −1,500 RPM to about −1,000 RPM.

A third fan speed operating band 752 is representative of an operation of the output member coupled with the fan of about −1,000 RPM to about −500 RPM.

A fourth fan speed operating band 753 is representative of an operation of the output member coupled with the fan of about −500 RPM to about 0 RPM.

A fifth fan speed operating band 754 is representative of an operation of the output member coupled with the fan of about 0 RPM to about 500 RPM.

A sixth fan speed operating band 755 is representative of an operation of the output member coupled with the fan of about 500 RPM to about 1,000 RPM.

A seventh fan speed operating band 756 is representative of an operation of the output member coupled with the fan of about 1,000 RPM to about 1,500 RPM.

An eight fan speed operating band 757 is representative of an operation of the output member coupled with the fan of about 1,500 RPM to about 2,000 RPM.

A ninth fan speed operating band 758 is representative of an operation of the output member coupled with the fan of about 2,000 RPM to about 2,500 RPM.

A tenth fan speed operating band 759 is representative of an operation of the output member coupled with the fan of about 2,500 RPM to about 3,500 RPM.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A drive system comprising:
    a transmission comprising:
        a housing;
        an output member rotatable about a longitudinal axis L and adapted for communication in driving relation with an associated equipment piece;
        a first input member rotatable about the axis L and adapted for communication in driven relation with an associated first power source; and
        a second input member rotatable about the axis L and adapted for communication in driven relation with an associated second power source,
        wherein the first and second input members are connected in differentially rotatable communication with the rotatable output member;
    a first coupling region defined on the first input member, the first coupling region adapting the drive system for selective connection with the associated first power source on-axis along the longitudinal axis L;
    a second coupling region defined on the second input member, the second coupling region adapting the drive system for selective connection with the associated second power source on-axis along the longitudinal axis L;
    a bearing set disposed between the first and second input members, the bearing set supporting positioning of the first and second input members relative to each other and guiding relative rotational movement between the first and second input members; and
    a lubrication circuit defined between the first and second input members, the lubrication circuit being configured to route a flow of an associated lubricating fluid between the first and second input members for lubricating and cooling the bearing set.

2. The drive system according to claim 1, wherein:
    the first coupling region defined on the first input member and the second coupling region defined on the second input member are mutually concentric.

3. The drive system according to claim 1, wherein:
    the first coupling region defined on the first input member and the second coupling region defined on the second input member are mutually coaxial.

4. The drive system according to claim 1, wherein:
    the first input member and the second input member are mutually coaxial.

5. The drive system according to claim 1, wherein:
    the transmission comprises a planetary gear set comprising:

a planet carrier carrying planet gears;
a ring gear engaged with the planet gears; and
a sun gear engaged with the planet gears.

6. The drive system according to claim 5, wherein:
the output member is operatively coupled with the planet carrier of the planetary gear set;
the first input member is operatively coupled with the ring gear of the planetary gear set; and
the second input member is operatively coupled with the sun gear of the planetary gear set.

7. The drive system according to claim 6, wherein:
the first input member coupled with the ring gear is operable to be driven by the associated first power source to rotate in a first rotational direction relative to the housing;
the second input member coupled with the sun gear is operable to be driven by the associated second power source to rotate in the first rotational direction relative to the housing; and
the output member coupled with the planet carrier carrying the associated fan is differentially operated by the ring and sun gears to rotate in the first rotational direction relative to the housing.

8. The drive system according to claim 6, wherein:
the first input member coupled with the ring gear is operable to be driven by the associated first power source to rotate in a first rotational direction relative to the housing;
the second input member coupled with the sun gear is operable to be driven by the associated second power source to rotate in a second rotational direction opposite the first rotational direction relative to the housing; and
the output member coupled with the planet carrier carrying the associated fan is differentially operated by the ring and sun gears to rotate in the second rotational direction relative to the housing.

9. The drive system according to claim 1, wherein:
the housing of the transmission defines a chamber configured to hold a volume of an associated lubricious fluid.

10. The drive system according to claim 9, further comprising:
a first seal member disposed between the first and second input members; and
a housing seal member disposed between the second input member and the housing of the transmission,
wherein the first seal member and the housing seal member cooperatively prevent a flow of associated lubricious fluid out from the chamber of the housing.

11. The drive system according to claim 1, wherein:
the first and second input members are coaxially arranged;
the bearing set comprises a first bearing member disposed between the first and second input members on one end of the first input member, and a second bearing member disposed between the first and second input members on the other end of the first input member, wherein the first and second bearing members are spaced apart along the longitudinal axis L defining a space portion of the lubrication circuit between each other and between the first and second input members; and
the second input member defines an input port of the lubrication circuit configured to receive the associated lubricating fluid into the space portion of the lubrication circuit between the first and second input members, and an exit port of the lubrication circuit configured to expel the associated lubricating fluid from the space portion of the lubrication circuit between the first and second input members.

12. The drive system according to claim 11, wherein:
the first and second bearing members are disposed along the longitudinal axis L between the input and exit ports.

13. The drive system according to claim 12, further comprising:
first and second seal members disposed between the first and second input members, the first seal member being disposed between the first and second input members on a side of the input port opposite the first bearing member along the longitudinal axis L, and the second seal member being disposed between the first and second input members on a side of the exit port opposite the second bearing member along the longitudinal axis L; and
first and second gerotor seal members disposed between the second input member 140 and the associated second power source comprising a gerotor motor, wherein the first and second gerotor seal members seal a flow of the associated lubricating fluid between the lubrication circuit and the associated gerotor.

14. The drive system according to claim 1, wherein the first and second input members are disposed on opposite sides of the housing.

15. A drive system comprising:
a hydraulic motor;
a transmission comprising:
an output member rotatable about a longitudinal axis L and adapted for communication in driving relation with an associated equipment piece;
a first input member rotatable about the axis L and adapted for communication in driven relation with an associated first power source; and
a second input member rotatable about the axis L and adapted for communication in driven relation with the hydraulic motor,
wherein the first and second input members are connected in differentially rotatable communication with the rotatable output member;
a first coupling region defined on the first input member, the first coupling region adapting the drive system for selective connection with the associated first power source on-axis along the longitudinal axis L;
a second coupling region defined on the second input member, the second coupling region adapting the drive system for selective connection with the hydraulic motor on-axis along the longitudinal axis L;
a bearing set disposed between the first and second input members, the bearing set supporting positioning of the first and second input members relative to each other and guiding relative rotational movement between the first and second input members; and
a lubrication circuit defined between the first and second input members, the lubrication circuit being configured to route a flow of an associated lubricating fluid between the first and second input members for lubricating and cooling the bearing set.

16. The drive system according to claim 15, wherein:
the hydraulic motor comprises a gerotor motor; and
the first coupling region defined on the first input member and the second coupling region defined on the second input member are mutually coaxial.

17. The drive system according to claim 15, wherein:
the transmission comprises a planetary gear set comprising:

a planet carrier carrying planet gears;
a ring gear engaged with the planet gears; and
a sun gear engaged with the planet gears.

18. The drive system according to claim 17, wherein:
the output member is operatively coupled with the planet carrier of the planetary gear set;
the first input member is operatively coupled with the ring gear of the planetary gear set;
the second input member is operatively coupled with the sun gear of the planetary gear set.

19. The drive system according to claim 15, further comprising:
a first seal member disposed between the first and second input members; and
a housing seal member disposed between the second input member and the housing of the transmission,
wherein the housing of the transmission defines a chamber configured to hold a volume of an associated lubricious fluid,
wherein the first seal member and the housing seal member cooperatively prevent a flow of associated lubricious fluid out from the chamber of the housing.

20. An apparatus comprising:
a transmission comprising a housing, an output member adapted for communication in driving relation with an associated equipment piece, a first input member adapted for communication in driven relation with an associated first power source, and a second input member adapted for communication in driven relation with an associated second power source, wherein the first and second input members are connected in differentially rotatable communication with the output member;
a bearing set disposed between the first and second input members, the bearing set supporting positioning of the first and second input members relative to each other and guiding relative rotational movement between the first and second input members; and
a lubrication circuit defined in the housing of the transmission between the first and second input members, wherein the lubrication circuit is operative to route a flow of an associated fluid between the first and second input members for lubricating and cooling the bearing set.

\* \* \* \* \*